(12) United States Patent
Maroney et al.

(10) Patent No.: US 9,083,265 B1
(45) Date of Patent: Jul. 14, 2015

(54) SYSTEMS AND METHODS FOR CONTROLLING AND MONITORING MULTIPLE FANS IN CONJUNCTION WITH A SINGLE FAN CONTROLLER

(71) Applicant: Western Digital Technologies, Inc., Irvine, CA (US)

(72) Inventors: John E. Maroney, Irvine, CA (US); Samuel K. Baughman, Anaheim, CA (US); Varujan Sahakian, Encino, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 108 days.

(21) Appl. No.: 13/931,824

(22) Filed: Jun. 29, 2013

Related U.S. Application Data

(60) Provisional application No. 61/824,861, filed on May 17, 2013.

(51) Int. Cl.
*H02K 7/14* (2006.01)
*H02P 5/00* (2006.01)

(52) U.S. Cl.
CPC .......................................... *H02P 5/00* (2013.01)

(58) Field of Classification Search
CPC ........................................................ H02P 7/29
USPC ............................................... 318/3, 599, 560
See application file for complete search history.

(56) References Cited

U.S. PATENT DOCUMENTS

| | | | | |
|---|---|---|---|---|
| 5,727,928 A | * | 3/1998 | Brown | 417/44.11 |
| 7,142,125 B2 | * | 11/2006 | Larson et al. | 340/635 |
| 7,425,812 B2 | * | 9/2008 | Goldberg | 318/610 |
| 7,495,407 B2 | * | 2/2009 | Huang et al. | 318/599 |
| 7,761,192 B2 | | 7/2010 | Lo | |

* cited by examiner

*Primary Examiner* — David S Luo

(57) ABSTRACT

Systems and methods for controlling and monitoring multiple fans in conjunction with a single fan controller are described. One such system includes the single fan controller, a plurality of fans, and a multi-fan monitor configured to receive a signal indicative of fan speed for each of the fans, (a) determine, for a selected fan of the fans, whether the respective received fan speed signal is within an expected fan speed range, if the respective received fan speed signal is not within the expected fan speed range transmit a signal to the single fan controller indicative of a fan failure, if the respective received fan speed signal is within the expected fan speed range transmit a signal to the single fan controller indicative of the fan speed for each of the fans, and return to (a) to test a next selected fan of the fans.

34 Claims, 3 Drawing Sheets

SYSTEMS AND METHODS FOR CONTROLLING AND MONITORING MULTIPLE FANS IN CONJUNCTION WITH A SINGLE FAN CONTROLLER

CROSS-REFERENCE TO RELATED APPLICATION(S)

This application claims priority to and the benefit of U.S. Provisional Application No. 61/824,861, filed on May 17, 2013 and entitled, "SYSTEMS AND METHODS FOR CONTROLLING AND MONITORING MULTIPLE FANS IN CONJUNCTION WITH A SINGLE FAN CONTROLLER", the entire content of which is incorporated herein by reference.

BACKGROUND

Rack-mount computer systems generally need multiple cooling fans which are typically driven by multiple fan controllers. The cooling fans can be important to keep operating temperatures of the rack-mounted computer systems within safe levels. The cooling fans are often mounted within the housing of a rack-mounted computer. The interiors of the housing can be exhausted to a fan exhaust plenum chamber often times constructed within the rack along a side of the housing.

As the number of cooling fans increase in such rack-mounted servers and the complexity of techniques for controlling such fans also increase, such systems can include multiple fan controllers. However, the costs associated with having multiple fan controllers can be prohibitive in certain applications. In addition, some systems lack controllers configured to adequately handle multiple fans.

DETAILED DESCRIPTION

Figure 1:
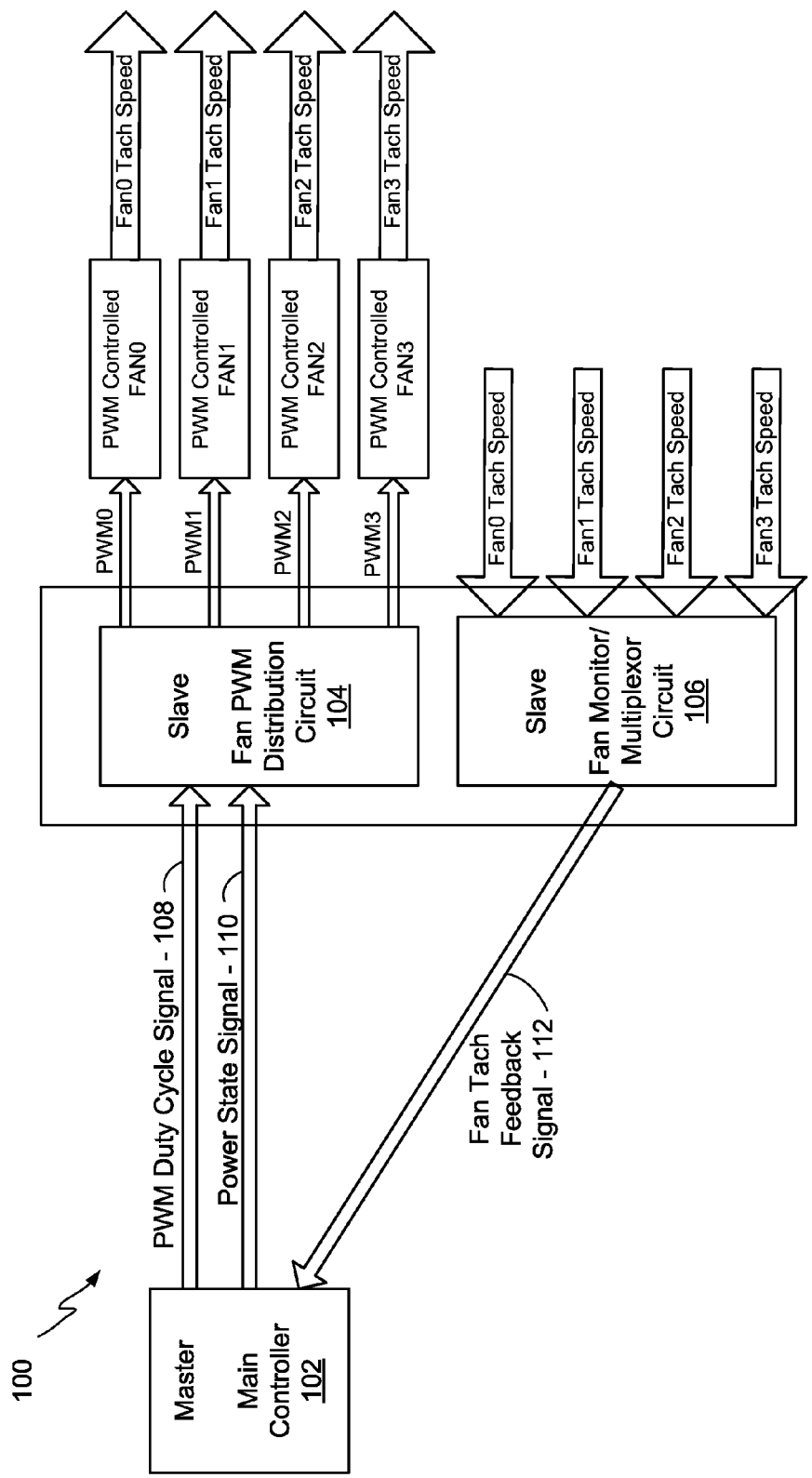
FIG. 1 is a schematic block diagram of a control system including a main/single fan controller and a fan controller including a fan PWM distribution circuit and a fan monitor/multiplexor circuit for controlling and monitoring, respectively, multiple fans in accordance with one embodiment of the invention.

In some designs, a rack-mount computer system is provided that includes a controller board utilizing a single fan controller (e.g., ordinarily used to control a single fan) to control multiple fans. The single fan controller can be configured to control pulse width modulation (PWM) and monitor fan tachometer readings for multiple fans in a rack-mount or other system design. Using a single fan controller to control multiple fans can reduce costs. However, using the single fan controller can also introduce a problem of determining which of the multiplexed fans is failing when a fan failure is detected, as the single fan controller generally only "sees" one fan.

Systems and methods for controlling and monitoring multiple fans in conjunction with a single fan controller are described herein. To address the problem described above related to the operation of multiplexed fans and a single fan controller, the systems and methods described herein can involve a multi-fan monitor coupled to the single fan controller that can serially monitor each of the fans. In several embodiments, a system for monitoring multiple fans in conjunction with a fan controller configured to control a single fan is provided. The system can include the single fan controller, a plurality of fans, and a multi-fan monitor coupled to the single fan controller and the plurality of fans. The multi-fan monitor can be configured to receive a signal indicative of fan speed for each of the plurality of fans, and to determine, for a selected fan of the plurality of fans, whether the respective received fan speed signal is within an expected fan speed range. In such case, if the respective received fan speed signal of the selected fan is not within the expected fan speed range, the multi-fan monitor can be configured to transmit a signal to the single fan controller indicative of a fan failure. If the respective received fan speed signal of the selected fan is within the expected fan speed range, multi-fan monitor can be configured to transmit a signal to the single fan controller indicative of the fan speed for each of the plurality of fans, and return to determining whether the respective received fan speed signal is within an expected fan speed range to test a next selected fan of the plurality of fans.

In another embodiment, a system for controlling multiple fans in conjunction with a fan controller configured to control a single fan is provided. The system can include the single fan controller, a plurality of fans, and a multi-fan controller coupled to the single fan controller and the plurality of fans. In such case, the multi-fan controller configured to receive a pulse width modulated (PWM) input signal indicative of an expected fan speed, distribute a PWM output signal to each of the plurality of fans, set, if a frequency of the PWM input signal is not within a base frequency range, the duty cycle of the PWM output signal to a preselected percentage, and set, if the frequency of the PWM input signal is within the base frequency range and a duty cycle of the PWM input signal is within a preselected duty cycle range, the duty cycle of the PWM output signal to the duty cycle of the PWM input signal.

In other embodiments, methods for monitoring or controlling multiple fans in conjunction with a fan controller configured to control a single fan that reflect the monitor and control systems described above can be used.

FIG. 1 is a schematic block diagram of a control system 100 including a main/single fan controller 102 and a fan controller including a fan PWM distribution circuit (e.g., "multi-fan controller") 104 and a fan monitor/multiplexor circuit (e.g., "multi-fan monitor") 106 for controlling and monitoring, respectively, multiple fans (FAN0-FAN3) in accordance with one embodiment of the invention. The main controller 102 is coupled to the fan PWM distribution circuit 104 and the fan monitor/multiplexor circuit 106, which may collectively be referred to as a fan controller circuit. The main controller 102 may be implemented in hardware or software. In one embodiment, for example, the main controller 102 represents the operating system of a rack-mounted server. In several embodiments, the main controller 102 can be thought of as a fan controller configured to control a single fan. In several embodiments, the main controller 102 can be thought of as the master controller while the fan PWM distribution circuit 104 and the fan monitor/multiplexor circuit 106 can be thought of as slave controllers.

In the control system 100 depicted in FIG. 1, the fan PWM distribution circuit 104 receives a fan drive signal or PWM duty cycle signal 108 in the form of a PWM fixed frequency drive signal from the main controller 102. The fan PWM distribution circuit 104 also receives a power state signal 110

(e.g., indicative of states such as operational, standby, sleep, and other such states) from the main controller 102. The fan PWM distribution circuit 104 generates and outputs preselected PWM signals (PWM0, PWM1, PWM2, PWM3) to drive multiple fans including FAN0, FAN1, FAN2, and FAN3.

In the control system 100 depicted in FIG. 1, the fan monitor/multiplexor circuit 106 receives tachometer signals indicating fan speed from each of the multiple fans including FAN0, FAN1, FAN2, and FAN3. The fan monitor/multiplexor circuit 106 can also generate and output a fan tachometer (e.g., "tach") feedback signal 112 to the main controller 102. In some embodiments, the fan tach feedback signal 112 is an aggregated average of the tachometer signals from the fans and therefore does not include individualized fan speed information. In some embodiments, the fan tach feedback signal 112 provides individualized fan speed information in a multiplexed format. In other embodiments, the fan tach feedback signal 112 can provide fan speed information in other suitable formats known in the art.

Each of the main controller 102, the fan PWM distribution circuit 104, and/or the fan monitor/multiplexor circuit 106 can be implemented with various components such as a processor and memory to store information (or entirely in software executing on a server including a processor and memory). In this context, the processor refers to any machine or selection of logic that is capable of executing a sequence of instructions and should be taken to include, but not limited to, general purpose microprocessors, special purpose microprocessors, central processing units (CPUs), digital signal processors (DSPs), application specific integrated circuits (ASICs), signal processors, microcontrollers, and other suitable circuitry. Further, it should be appreciated that the term processor, microprocessor, circuitry, controller, etc., refer to any type of logic or circuitry capable of executing logic, commands, instructions, software, firmware, functionality, etc. In some embodiments, fan PWM distribution circuit 104 and fan monitor/multiplexor circuit 106 can be implemented using the same controller, using the same circuit board, using separate controllers, or on separate circuit boards.

Figure 2:
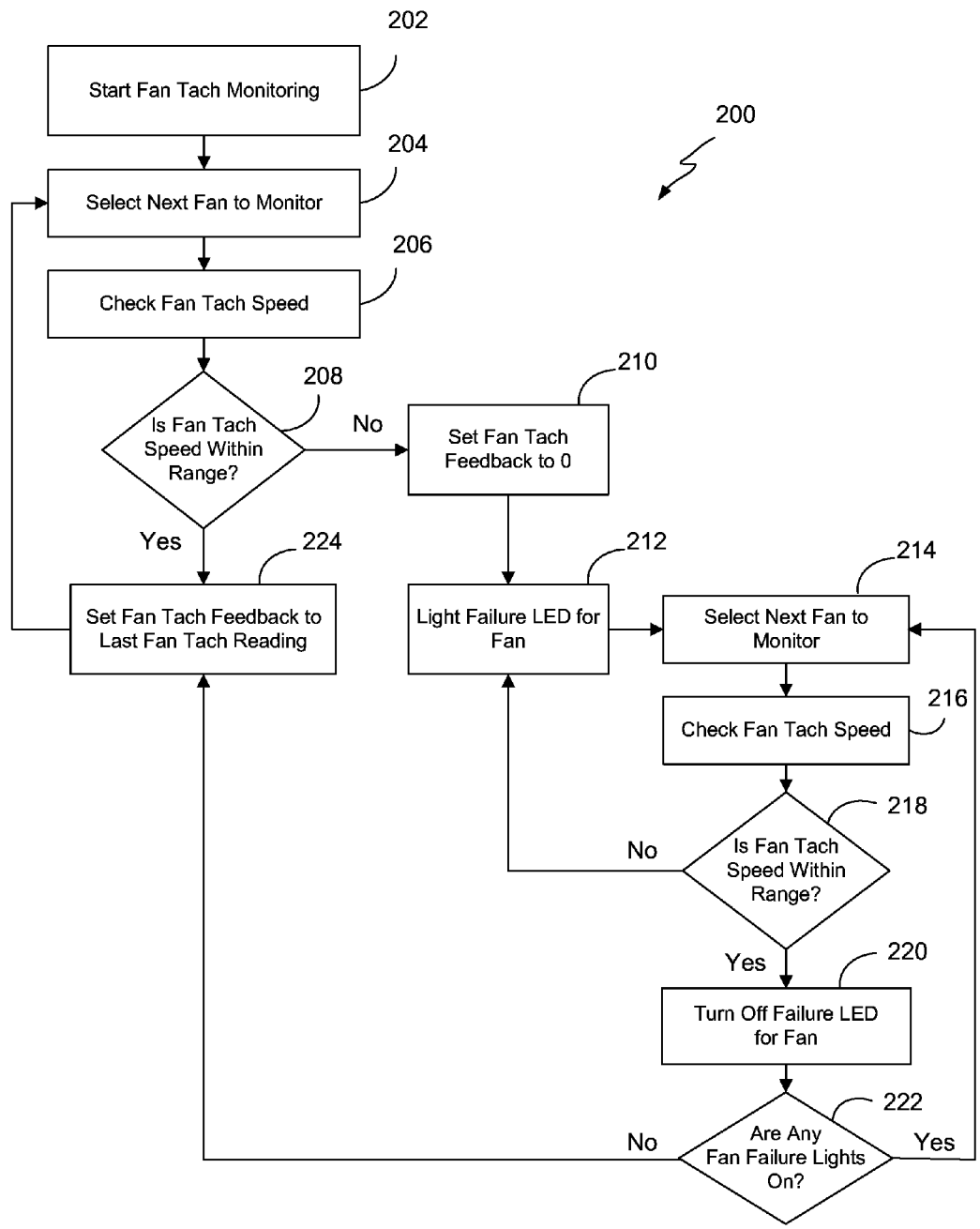
FIG. 2 is a flow chart of a process for operating the fan monitor/multiplexor circuit of the fan controller of FIG. 1 in accordance with one embodiment of the invention.

FIG. 2 is a flow chart of a process 200 for operating the fan monitor/multiplexor circuit 106 of the fan controller of FIG. 1 in accordance with one embodiment of the invention. The process can start fan tachometer (e.g., "tach") monitoring in block 202. The process can select a fan (or after the first fan, select a next fan) to monitor in block 204. The process can then check the fan tachometer speed reading in block 206. In several embodiments, the fan tach speed is compared, in block 208, to a preselected range. In one embodiment, the preselected range can represent a percentage (e.g., plus or minus 25% or another suitable percentage) of an expected value. In some embodiments, the preselected range can be from 0 to a preselected fan speed threshold such that the process effectively determines whether the fan tach speed reading is below the preselected fan speed threshold. In other embodiments, the preselected range can be from the preselected fan speed threshold to infinity such that the process effectively determines whether the fan tach speed reading is above the preselected fan speed threshold.

If the fan tachometer speed reading is not within the expected fan speed range in block 208, the process sets the fan tachometer feedback output signal to zero in block 210, effectively outputting a signal indicative of fan failure. In setting the fan tach feedback signal to zero, the process effectively communicates to the main controller 102 that at least one fan has failed. In several embodiments, this is because the fans controlled are high power fans with a baseline minimum speed (e.g., 3,000 revolutions per minute, or RPM, or another such default value) that is generally maintained despite any instructions/commands for zero speed. In such case, a fan speed of zero reported to the main controller indicates a condition that is not considered possible for a non-defective fan with the baseline minimum speed.

After block 210, the process sets or lights a failure light (e.g., light emitting diode or LED) for the fan being tested in block 212. The process then selects a next fan to monitor in block 214, checks the fan tachometer speed reading in block 216, and compares the fan tachometer speed with an expected fan speed range in block 218. In some embodiments, the expected fan speed range of block 218 is equal to the expected fan speed range of block 208. In other embodiments, they are different ranges. If the fan tachometer reading is within the preselected range in block 218, the process turns off the failure light for the selected fan in block 220. The process then checks to see if any fan failure lights are on in block 222, and if so the process returns to block 214. However, if no fan failure lights are on in block 222, then the process sets the fan tachometer output (e.g., fan tach feedback signal) to the last fan tachometer reading in block 224.

Returning now to block 218, if the fan tachometer reading not within the expected fan speed range, then the process returns to block 212 and lights a failure LED for the selected fan. Returning now to block 208, if the fan tachometer reading is within the expected fan speed range, then the process proceeds to block 224 and sets the fan tachometer feedback signal to the last fan tachometer reading.

In several embodiments, a technician may respond to a set fan failure LED by servicing a fan (e.g., by replacing the fan) and thereby returning the fan to a fan speed within the expected range. In such case, the process can turn off the respective failure LED in block 220.

In one embodiment, the process can perform the sequence of actions in a different order. In another embodiment, the process can skip one or more of the actions. In other embodiments, one or more of the actions are performed simultaneously. In some embodiments, additional actions can be performed.

In some embodiments, for example, the process only performs the actions associated with blocks 202 through 210 and 224 to notify an external controller (e.g., the single fan controller 102 of FIG. 1) that a fan failure has occurred. In one such embodiment, the process can also perform the action of block 212 to light a failure LED for the selected fan having the fan speed that is not within the expected range.

In several embodiments, the multi-fan monitor can receive the expected fan speed range from the single fan controller. In other embodiments, the expected fan speed range is a stored value. In one embodiment, the expected fan speed range extends from a preselected fan speed minus about 25 percent to the preselected fan speed plus about 25 percent. In several embodiments, the preselected fan speed depends on a specified PWM duty cycle setting. In one embodiment, for example, the preselected speed can be about 3000 rpm when the PWM duty cycle setting is about zero. In another embodiment, the preselected fan speed is about 7500 rpm for a 50 percent duty cycle where the preselected fan speed is in a range from about 3,000 rpm to about 18,000 rpm. In one embodiment, the process also computes an average fan speed for all of the fans and sets the fan tach feedback signal to a value indicative of the computed average fan speed.

In one embodiment, if a selected fan speed reading appears outside of an expected range, the controller can set a failure LED associated with each fan on, apply a baseline output to each fan (e.g. 0 RPM), check each fan against an expected baseline output, and then turn off the failure LED(s) for passing fans. In such case, at the end, only the failure LED(s) associated with the actual failed fan(s) can remains on, thereby allowing the controller to indicate the correct failed fan(s).

In the embodiment of FIG. 1, four fans are depicted. However, the systems and methods described herein can apply to systems having two or more fans.

Figure 3:
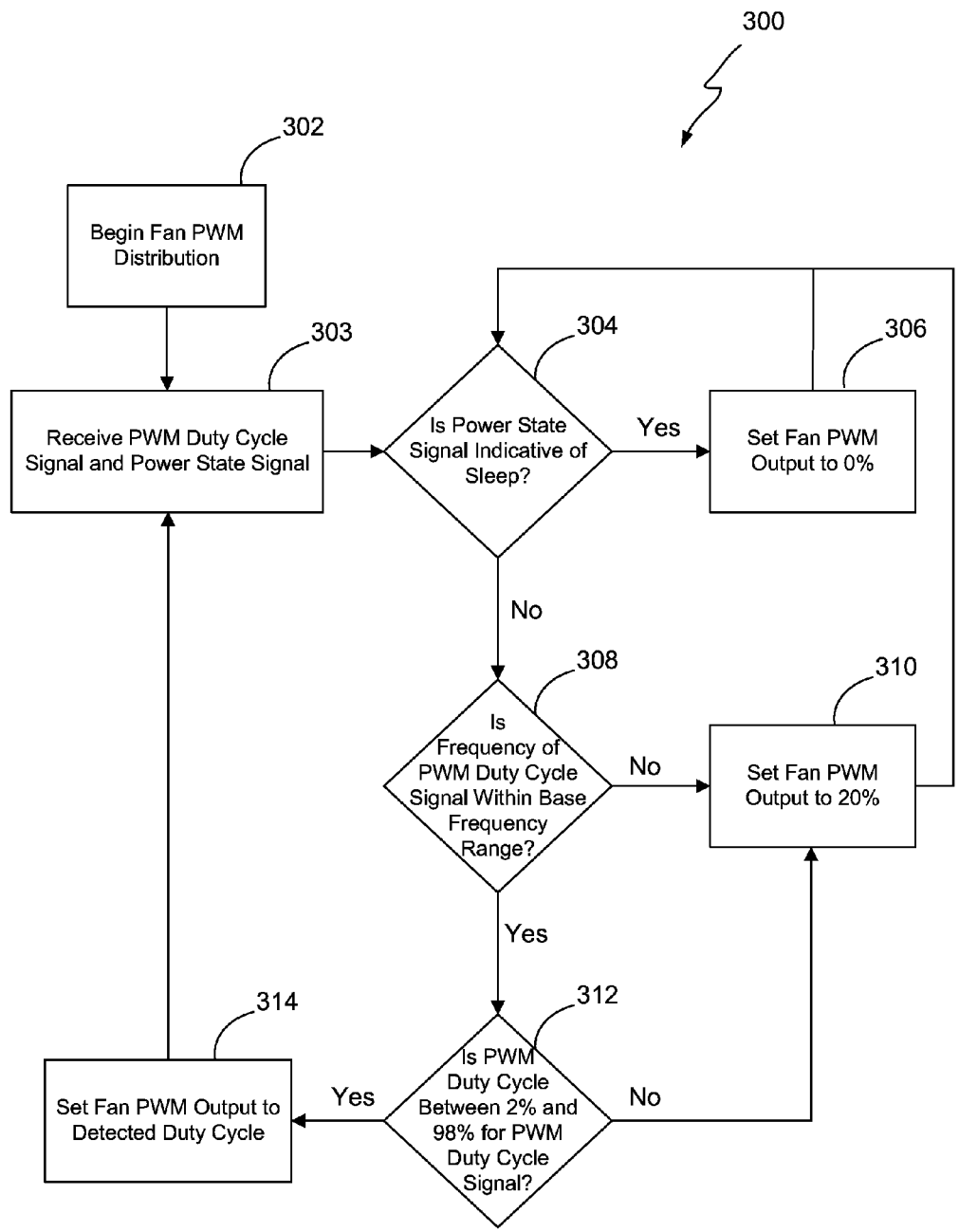
FIG. 3 is a flow chart of a process for operating the fan PWM distribution circuit of the fan controller of FIG. 1 in accordance with one embodiment of the invention.

FIG. 3 is a flow chart of a process 300 for operating the fan PWM distribution circuit 104 of the fan controller of FIG. 1 in accordance with one embodiment of the invention. The process first begins the fan PWM distribution in block 302. The process then receives a PWM duty cycle signal and power state signal in block 303 (e.g., signals 108 and 110 of FIG. 1, respectively). In several embodiments, these signals are received from the single fan controller 102 of FIG. 1. The process then determines whether the power state signal is indicative of a sleep mode, or another non-operative state, in block 304. If so, the process sets a fan PWM output to zero percent, or about zero percent, in block 306 and then returns to block 304. For example, in one such embodiment, the fan PWM outputs (e.g., PWM0, PWM1, PWM2, PWM3 in FIG. 1) for each fan are made to be zero percent, or about zero percent.

Alternatively, if the power state signal is not indicative of a sleep mode in block 304, then the process determines whether a frequency of the PWM duty cycle signal is within a base frequency range in block 308. In several embodiments, the base frequency range is a range from about 1 kilo-hertz to about 15 kilo-hertz. In one such embodiment, the base frequency range is somewhat narrower, and is a range from about 2.5 kilo-hertz to about 3.5 kilo-hertz. In several embodiments, the base frequency might be expected to be about 3 kilo-hertz. If the frequency of the PWM duty cycle signal is not within the base frequency range in block 308, then the process sets the fan PWM output to about 20 percent, or another preselected percentage, in block 310 and then returns to block 304.

If the frequency of the PWM duty cycle signal is within the base frequency range in block 308, then the process determines whether a duty cycle of the PWM duty cycle signal is within a preselected duty cycle range in block 312. In FIG. 3, the preselected duty cycle range is shown to be about 2 percent to about 98 percent. In other embodiments, the preselected duty cycle range can have other suitable ranges. If the duty cycle of the PWM duty cycle signal is not within the preselected duty cycle range in block 312, then the process sets the fan PWM output to about 20 percent, or another preselected percentage, in block 310 and then returns to block 304. Alternatively, if the duty cycle of the PWM duty cycle signal is within the preselected duty cycle range in block 312, then the process sets the fan PWM output to a detected duty cycle of the PWM duty cycle signal in block 314 and then returns to block 303.

In several embodiments, the fan PWM distribution circuit 104 of FIG. 1 can generate and distribute the PWM control signal from the single fan controller 102 (e.g., controller board) to the connected fans (FAN0, FAN1, FAN2, FAN3). The fan PWM distribution circuit 104 is designed to monitor (e.g., in blocks 303, 304, 306) for a base PWM frequency to determine if the controller board (e.g., main controller) is functional (block 304 checks to see if a sleep mode is detected). Other potential modes can include operational, stand-by and/or other non-operational states. If the appropriate PWM base frequency is not detected (in block 308), the fan controller can default to driving the fans at a low duty factor (e.g., 20 percent or another suitable percentage in block 310). To ensure detection of the base PWM frequency, fan PWM distribution circuit 104 can ensure a minimum PWM duty factor of about 2 percent (or another suitable percentage) and a maximum PWM duty factor of about 98 percent (or another suitable percentage) in block 312. If the fan controller detects a duty factor outside of these ranges, it can default to the low duty factor mode (block 310) even if the base PWM frequency is present.

The fan PWM distribution circuit 104 also monitors a system sleep signal (in block 304) to determine whether the main controller (e.g., server) is in a standby or sleep state, or other non-operational mode. If this signal is detected, the fan controller will drive the fans at about 0 percent PWM, or another suitable PWM value, in block 306.

In several embodiments, a rack mounted server can take about 90 seconds to boot up, or even up to 5 minutes. In such case, the base PWM frequency for the fans will likely not be asserted by the main controller (e.g., 102), or therefore detected by the PWM distribution circuit, and the process will set the fan output to be about 20 percent duty cycle (or another appropriate duty cycle value) in block 310. In contrast, the fans of conventional systems often default to 100 percent in this situation (e.g., when no control signal is detected), which can be both inefficient and unproductive. In addition, setting the fans to 100 percent can increase wear on the fans and can create significant noise. By overriding the default behavior of fans, the control systems described herein can avoid or alleviate these issues.

In several embodiments, the process 300 operating on the PWM distribution circuit can, in effect, take affirmative fan controlling action based on whether a frequency lock is established, on a specific power state (e.g., sleep mode, standby, etc.) of the main controller/server, and whether the main controller is operational or not.

In one embodiment, the process can perform the sequence of actions in a different order. In another embodiment, the process can skip one or more of the actions. In other embodiments, one or more of the actions are performed simultaneously. In some embodiments, additional actions can be performed. For example, in some embodiments, blocks 304 and 306 can be eliminated from the process such that it is focused more on the detection of a base frequency of the PWM duty cycle signal (in block 308) and whether a duty cycle of the PWM duty cycle signal is within a preselected duty cycle range (in block 312). In one such embodiment, if the duty cycle of the PWM duty cycle signal is not within the preselected duty cycle range in block 312, then the process can set the fan PWM output to a default percentage or not drive the fan PWM output at all.

In some embodiments, the fans may have different individual characteristics that cause them to oscillate at different frequencies (e.g., there is a "beat frequency" between fans), even when the duty cycle inputs to each are about the same. These beat frequency differences can cause the server to fail acoustic tests and cause other related problems. To address this issue, in some embodiments, the process 300, and possibly in conjunction with process 200, can set the duty cycles individually for one or more fans to minimize the overall sound power generated by the server or to balance these individual fan frequencies, which are provided by the fan tach outputs from each fan. In doing so, the process can effectively tune the fan tach output frequencies (e.g., make them about the same) by actively adjusting the duty cycles for each fan.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A system for monitoring multiple fans in conjunction with a fan controller configured to control a single fan, the system comprising:
    the single fan controller;
    a plurality of fans; and
    a multi-fan monitor coupled to the single fan controller and the plurality of fans, the multi-fan monitor configured to:
        receive a signal indicative of fan speed for each of the plurality of fans;
        (a) determine, for a selected fan of the plurality of fans, whether the respective received fan speed signal is within an expected fan speed range;
        if the respective received fan speed signal of the selected fan is not within the expected fan speed range:
            transmit a signal to the single fan controller indicative of a fan failure;
        if the respective received fan speed signal of the selected fan is within the expected fan speed range:
            transmit a signal to the single fan controller indicative of the fan speed for each of the plurality of fans; and
            return to (a) to test a next selected fan of the plurality of fans.

2. The system of claim 1, wherein the multi-fan monitor is further configured to:
    set, if the respective received fan speed signal of the selected fan is not within the expected fan speed range, a fan failure indicator for the selected fan.

3. The system of claim 2, wherein the multi-fan monitor is further configured to:
    (b) determine, for a next selected fan of the plurality of fans, whether the respective received fan speed signal is within the expected fan speed range;
    if the respective received fan speed signal of the next selected fan is not within the expected fan speed range:
        set a fan failure indicator for the next selected fan;
        return to (b); and
    if the received fan speed signal of the next selected fan is within the expected fan speed range:
        clear a fan failure indicator for the next selected fan;
        if none of the fan failure indicators are set, transmit the signal to the single fan controller indicative of the fan speed for each of the plurality of fans and return to (a); and
    if at least one of the fan failure indicators is set, return to (b).

4. The system of claim 1, wherein the multi-fan monitor is further configured to receive the expected fan speed range from the single fan controller.

5. The system of claim 1, wherein the expected fan speed range is a preselected fan speed plus or minus about 25 percent.

6. The system of claim 1, wherein the multi-fan monitor is further configured to transmit the signal to the single fan controller indicative of the fan failure by setting the fan speed signal to about 0.

7. The system of claim 1, wherein the multi-fan monitor is further configured to:
    compute an average fan speed for all of the plurality of fans; and
    set the fan speed signal to the average fan speed.

8. The system of claim 1, wherein the expected fan speed range is selected from a range consisting of a range from 0 to a preselected fan speed threshold and a range from the preselected fan speed threshold to infinity.

9. A system for controlling multiple fans in conjunction with a fan controller configured to control a single fan, the system comprising:
    the single fan controller;
    a plurality of fans; and
    a multi-fan controller coupled to the single fan controller and the plurality of fans, the multi-fan controller configured to:
        receive a pulse width modulated (PWM) input signal indicative of an expected fan speed;
        distribute a PWM output signal to each of the plurality of fans;
        set, if a frequency of the PWM input signal is not within a base frequency range, the duty cycle of the PWM output signal to a preselected percentage; and
        set, if the frequency of the PWM input signal is within the base frequency range and a duty cycle of the PWM input signal is within a preselected duty cycle range, the duty cycle of the PWM output signal to the duty cycle of the PWM input signal.

10. The system of claim 9, wherein the multi-fan controller if further configured to:
    set, if the frequency of the PWM input signal is within the base frequency range and the duty cycle of the PWM input signal is not within the preselected duty cycle range, the duty cycle of the PWM output signal to the preselected percentage.

11. The system of claim 9, wherein the multi-fan controller if further configured to:
    receive a signal indicative of a power state of a computer comprising the single fan controller, the plurality of fans, and the multi-fan controller; and
    set, if the power state signal reflects a non-operative state, a duty cycle of the PWM output signal to 0.

12. The system of claim 11, wherein the non-operative state comprises a sleep state.

13. The system of claim 9, wherein the preselected percentage is about 20 percent.

14. The system of claim 9, wherein the preselected duty cycle range is from about 2 percent to about 98 percent.

15. The system of claim 9, wherein the base frequency range is from about 1 kilo-hertz to about 15 kilo-hertz.

16. The system of claim 15, wherein the base frequency range is from about 2.5 kilo-hertz to about 3.5 kilo-hertz.

17. The system of claim 9, further comprising:
a multi-fan monitor coupled to the single fan controller and the plurality of fans, the multi-fan monitor configured to:
receive a signal indicative of fan speed for each of the plurality of fans;
(a) determine, for a selected fan of the plurality of fans, whether the respective received fan speed signal is within an expected fan speed range;
if the respective received fan speed signal of the selected fan is not within the expected fan speed range:
transmit a signal to the single fan controller indicative of a fan failure;
if the respective received fan speed signal of the selected fan is within the expected fan speed range:
transmit a signal to the single fan controller indicative of the fan speed for each of the plurality of fans; and
return to (a) to test a next selected fan of the plurality of fans.

18. A method for monitoring multiple fans in conjunction with a fan controller configured to control a single fan, the method comprising:
receiving, from each of a plurality of fans, a signal indicative of fan speed;
(a) determining, for a selected fan of the plurality of fans, whether the respective received fan speed signal is within an expected fan speed range;
if the respective received fan speed signal of the selected fan is not within the expected fan speed range:
transmitting, to the single fan controller, a signal indicative of a fan failure; and
if the respective received fan speed signal of the selected fan is within the expected fan speed range:
transmitting, to the single fan controller, a signal indicative of the fan speed for each of the plurality of fans; and
returning to (a) to test a next selected fan of the plurality of fans.

19. The method of claim 18, further comprising:
setting, if the respective received fan speed signal of the selected fan is not within the expected fan speed range, a fan failure indicator for the selected fan.

20. The method of claim 19, further comprising:
(b) determining, for a next selected fan of the plurality of fans, whether the respective received fan speed signal is within the expected fan speed range;
if the respective received fan speed signal of the next selected fan is not within the expected fan speed range:
setting a fan failure indicator for the next selected fan;
returning to (b); and
if the received fan speed signal of the next selected fan is within the expected fan speed range:
clearing a fan failure indicator for the next selected fan;
if none of the fan failure indicators are set:
transmitting the signal to the single fan controller indicative of the fan speed for each of the plurality of fans, and
returning to (a); and
if at least one of the fan failure indicators is set, returning to (b).

21. The method of claim 18, further comprising receiving, from the single fan controller, the expected fan speed range.

22. The method of claim 18, wherein the expected fan speed range is a preselected fan speed plus or minus about 25 percent.

23. The method of claim 18, wherein the transmitting, to the single fan controller, the signal indicative of the fan failure comprises transmitting, to the single fan controller, the signal indicative of the fan speed, wherein the fan speed signal is set to about 0.

24. The method of claim 18, further comprising:
computing an average fan speed for all of the plurality of fans; and
setting the fan speed signal to the average fan speed.

25. The method of claim 18, wherein the expected fan speed range is selected from a range consisting of a range from 0 to a preselected fan speed threshold and a range from the preselected fan speed threshold to infinity.

26. A method for controlling multiple fans in conjunction with a fan controller configured to control a single fan, the method comprising:
receiving, from the single fan controller, a pulse width modulated (PWM) input signal indicative of an expected fan speed;
distributing, to each of the plurality of fans, a PWM output signal;
setting, if a frequency of the PWM input signal is not within a base frequency range, the duty cycle of the PWM output signal to a preselected percentage; and
setting, if the frequency of the PWM input signal is within the base frequency range and a duty cycle of the PWM input signal is within a preselected duty cycle range, the duty cycle of the PWM output signal to the duty cycle of the PWM input signal.

27. The method of claim 26, further comprising:
setting, if the frequency of the PWM input signal is within the base frequency range and the duty cycle of the PWM input signal is not within the preselected duty cycle range, the duty cycle of the PWM output signal to the preselected percentage.

28. The method of claim 26, further comprising:
receiving, from the single fan controller, a signal indicative of a power state of a computer comprising the single fan controller and a plurality of fans; and
setting, if the power state signal reflects a non-operative state, a duty cycle of the PWM output signal to 0.

29. The method of claim 28, wherein the non-operative state comprises a sleep state.

30. The method of claim 26, wherein the preselected percentage is about 20 percent.

31. The method of claim 26, wherein the preselected duty cycle range is from about 2 percent to about 98 percent.

32. The method of claim 26, wherein the base frequency range is from about 1 kilo-hertz to about 15 kilo-hertz.

33. The method of claim 32, wherein the base frequency range is from about 2.5 kilo-hertz to about 3.5 kilo-hertz.

34. The method of claim 26, further comprising:
receiving, from each of the plurality of fans, a signal indicative of fan speed;
(a) determining, for a selected fan of the plurality of fans, whether the respective received fan speed signal is within an expected fan speed range;
if the respective received fan speed signal of the selected fan is not within the expected fan speed range:
transmitting, to the single fan controller, a signal indicative of a fan failure; and
if the respective received fan speed signal of the selected fan is within the expected fan speed range:
transmitting, to the single fan controller, a signal indicative of the fan speed for each of the plurality of fans; and returning to (a) to test a next selected fan of the plurality of fans.

\* \* \* \* \*